United States Patent
Grycan et al.

[11] Patent Number: 5,921,173
[45] Date of Patent: Jul. 13, 1999

[54] BAKEWARE WITH PATTERNED SURFACE TEXTURE

[75] Inventors: Stanley M. Grycan, Sheboygan; Richard W. Thompson, Green Bay, both of Wis.

[73] Assignee: Newell Operating Company, Freeport, Ill.

[21] Appl. No.: 08/935,840

[22] Filed: Sep. 23, 1997

[51] Int. Cl.⁶ .................................................. A47J 37/10
[52] U.S. Cl. .................. 99/422; 99/447; 126/390
[58] Field of Search .................. 99/422, 447, 425, 99/444, 445; 126/390

[56] References Cited

U.S. PATENT DOCUMENTS

| | | | |
|---|---|---|---|
| 199,822 | 1/1878 | Geyser | 99/445 |
| 495,872 | 4/1893 | Ball | 99/422 |
| 1,644,255 | 10/1927 | Kercher et al. | 99/445 |
| 1,707,532 | 4/1929 | Moon | 99/425 |
| 2,008,767 | 7/1935 | Munn | 126/390 |
| 2,257,468 | 9/1941 | Langel | 99/422 |
| 2,534,407 | 12/1950 | Bramberry | 99/422 |
| 2,618,258 | 11/1952 | Kroyer | 99/422 |
| 2,774,295 | 12/1956 | Watkins | 99/425 |
| 3,545,645 | 12/1970 | Smith . | |
| 3,799,048 | 3/1974 | Finley | 99/425 |
| 4,078,479 | 3/1978 | Mori | 99/422 |
| 4,286,136 | 8/1981 | Mason | 99/425 |
| 4,676,151 | 6/1987 | Gorsuch et al. | 99/450 |
| 4,768,427 | 9/1988 | Cheng | 99/422 |
| 4,785,968 | 11/1988 | Logan et al. | 99/DIG. 15 |
| 5,351,608 | 10/1994 | Muchin et al. | 99/422 |
| 5,440,973 | 8/1995 | Welhouse | 99/425 |
| 5,628,426 | 5/1997 | Doyle et al. | 99/422 |

FOREIGN PATENT DOCUMENTS

| | | | |
|---|---|---|---|
| 104731 | 8/1938 | Australia | 99/422 |
| 315835 | 10/1956 | Denmark | 99/444 |
| 1122939 | 9/1956 | France . | |
| 459705 | 1/1937 | United Kingdom | 99/425 |
| 543735 | 3/1942 | United Kingdom | 99/425 |

*Primary Examiner*—Reginald L. Alexander
*Attorney, Agent, or Firm*—Foley & Lardner

[57] ABSTRACT

A baking device, such as a cookie sheet, includes a textured pattern on an upper surface of an upper metal sheet. The textured pattern includes a plurality of protrusions separated by recessed portions. The protrusions each have an upper food contacting surface which minimizes contact with a food product baking on the upper sheet so that the food product may be easily removed. The baking device may also include a polymeric coating to further enhance the non-stick properties of the baking device.

20 Claims, 4 Drawing Sheets

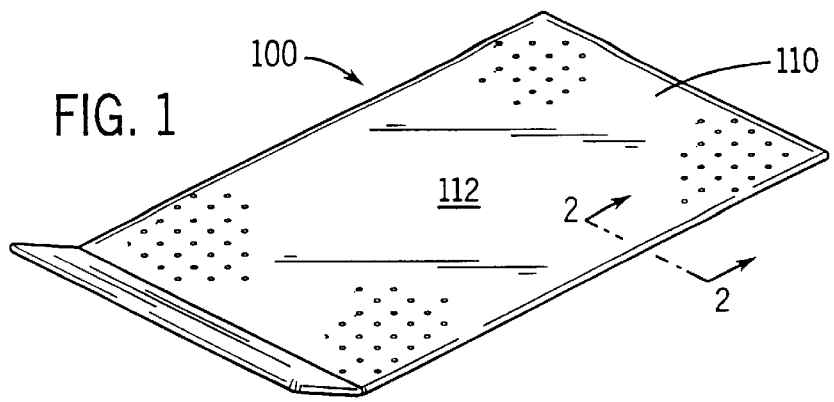
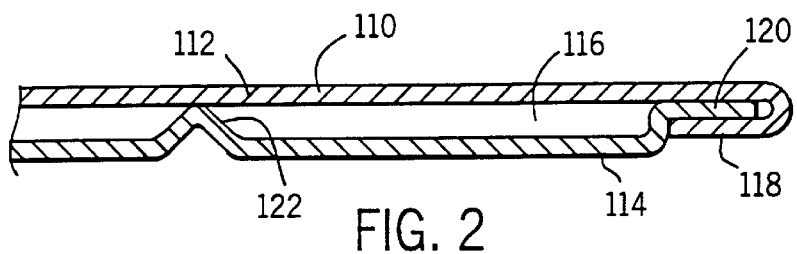
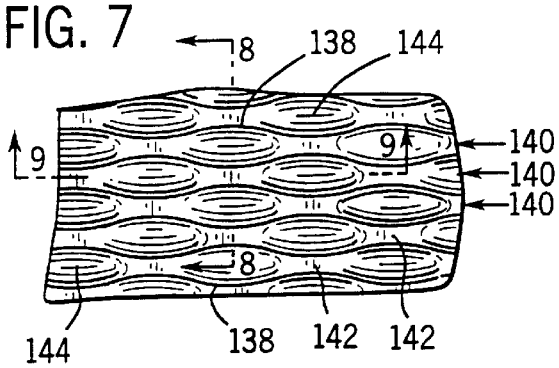
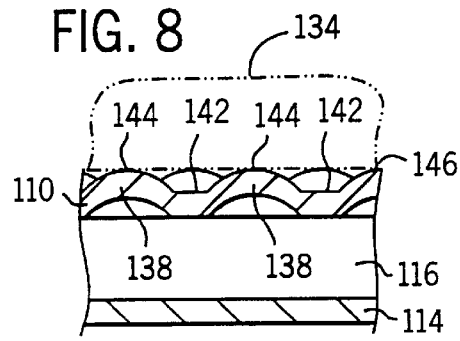
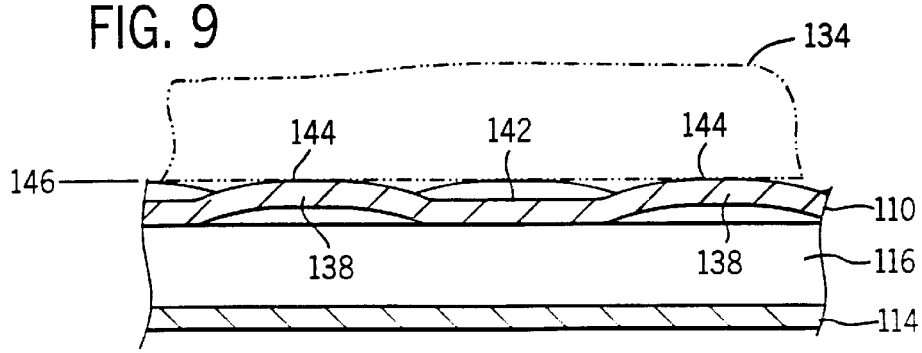

BAKEWARE WITH PATTERNED SURFACE TEXTURE

FIELD OF THE INVENTION

This invention relates generally to bakeware, and more particularly to bakeware having a patterned surface texture which facilitates the easy release of food products from the bakeware's surface.

BACKGROUND OF THE INVENTION

Over the years, bakeware has been made from various materials including steel, tin and aluminum. In more recent years, the structural material which comprises the bakeware is coated with a non-stick material which generally requires the use of special hand implements to prevent nicking or scratching of the coating. Even when these special hand implements are used, however, the coating tends to deteriorate through normal wear and tear, such as from washing and storing the bakeware. Such damage to the coating not only detrimentally affects the bakeware's non-stick properties, but the marred finish also is unsightly as it tends to corrode and/or discolor.

In the past, many attempts have to made to manufacture bakeware having a durable, non-stick baking surface, which also, to some extent, minimizes the occurrence, or disguises the appearance, of scratches, nicks, or other damage. For example, some manufacturers have resorted to the use of textured surfaces to hide scratches and other unsightly deformations of the bakeware surface. Such textured surfaces often include a combination of raised portions upon which the food rests and recessed portions which provide airways or channels under the food. Food products that are cooked or baked on these textured surface often release more easily because only a small fraction of the food actually comes into contact with the cooking surface. Further, these textured surfaces minimize the occurrences of scratches which result from using a cooking implement, such as a spatula or a spoon, because only the raised portions of the textured surface will be exposed to the implement's abrasive action. However, it is inherently difficult to utilize non-stick coatings on many of these textured surfaces because they often have sharp edges which either do not hold the coating well, do not coat evenly, or tend to bind or catch a spatula or a cleaning utensil. Accordingly, any coating which does cover the sharp edges will wear quickly, thus rapidly compromising the non-stick benefits offered by the bakeware.

Textured surfaces have also been used in bakeware to lower the fat and cholesterol content of food. In such low-fat applications, the textured surface typically includes channels or recesses to drain fat and grease away from the baking food and which are interspersed among closely spaced raised portions of the baking surface. Although often coated with a non-stick coating, the channels or recesses are difficult to clean because either a cleaning implement cannot easily reach between the closely spaced raised portions of the baking surface or the channels are too deep to effectively reach.

Accordingly, these is a need for a durable, improved cooking or baking surface that easily releases a food product placed thereon. Such a cooking or baking surface would include a combination of raised and recessed portions which provide a minimal food contacting surface area such that food products can be easily released. The raised portions would be sized, spaced and shaped such that the recessed portions of the surface could be easily reached with a cleaning implement. Further, the raised portions of the baking surface would expose only a small fraction of the total baking surface area to a cooking or cleaning implement passed across the surface. Accordingly, the occurrence of scratches would be minimized, thus providing a more durable and attractive baking surface. Further, the raised portions of the textured surface would be shaped such that a non-stick coating can be easily and uniformly applied. Additionally, even if the coating were to be removed from the raised portions of the surface, the surface's non-stick properties would not be significantly compromised since the coating would be removed from only a small fraction of the total baking surface area.

SUMMARY OF THE INVENTION

The present invention provides a baking device having an upper surface that includes a textured pattern. The textured pattern allows food products to be easily released, and improves the durability, appearance and life of the baking device. To further increase the baking device's non-stick properties, a non-stick coating may be applied to the textured pattern on the upper surface.

According to one aspect of the present invention, a baking device for baking a food product includes a first metal layer with an upper surface having a textured pattern. The textured pattern comprises a plurality of evenly spaced, substantially straight rows of protrusions which each have an upper food contacting surface. Adjacent rows of the protrusions are separated by a recessed portion. The upper food contacting surfaces of the protrusions are at a height of 0.002 to 0.050 inch relative to the recessed portions.

In another aspect of the invention, each row includes a plurality of protrusions which are evenly spaced along a length of the respective row.

In yet another aspect of the invention, the upper food contacting surfaces lie in a plane and have an area that is approximately equal to or less than one-third of an area of the plane.

A further aspect of the invention provides a baking device having a first metal layer and a second metal layer connected to the first metal layer such that an air pocket is formed therebetween. An upper surface of the first metal layer includes a textured pattern having a plurality of protrusions. Each protrusion has an upper food contacting surface that contacts a food product placed on the baking device.

In another aspect of the invention, the upper food contacting surfaces are rounded.

In yet another aspect of the invention, the baking device further includes a non-stick coating.

These and other features and advantages of the present invention will become apparent from the detailed description given hereinafter. It should be understood, however, that the detailed description and specific embodiments are illustrative only. Based on the following description, various changes and modifications within the scope and spirit of the invention will become readily apparent to those of ordinary skill in the art.

BRIEF DESCRIPTION OF THE DRAWINGS

The preferred exemplary embodiments of the present invention will hereinafter be described in conjunction with the appended figures, in which like reference numerals denote like elements, and:

FIG. 1 shows a perspective view of a baking device having a textured pattern on the upper surface in accordance with the invention;

FIG. 2 is a cross-sectional view of the baking device of FIG. 1, taken generally along the line 2—2, showing upper and lower metal layers with an air pocket therebetween;

FIG. 7 is a close-up of the baking device having the textured pattern of FIG. 6, illustrated generally in the area 7—7;

FIG. 8 is a cross-sectional view of the baking device having the textured pattern of FIG. 7, taken generally along the line 8—8;

FIG. 9 is a cross-sectional view of the baking device having the textured pattern of FIG. 7, taken generally along the line 9—9;

DETAILED DESCRIPTION OF THE PREFERRED EMBODIMENTS

Figure 3:
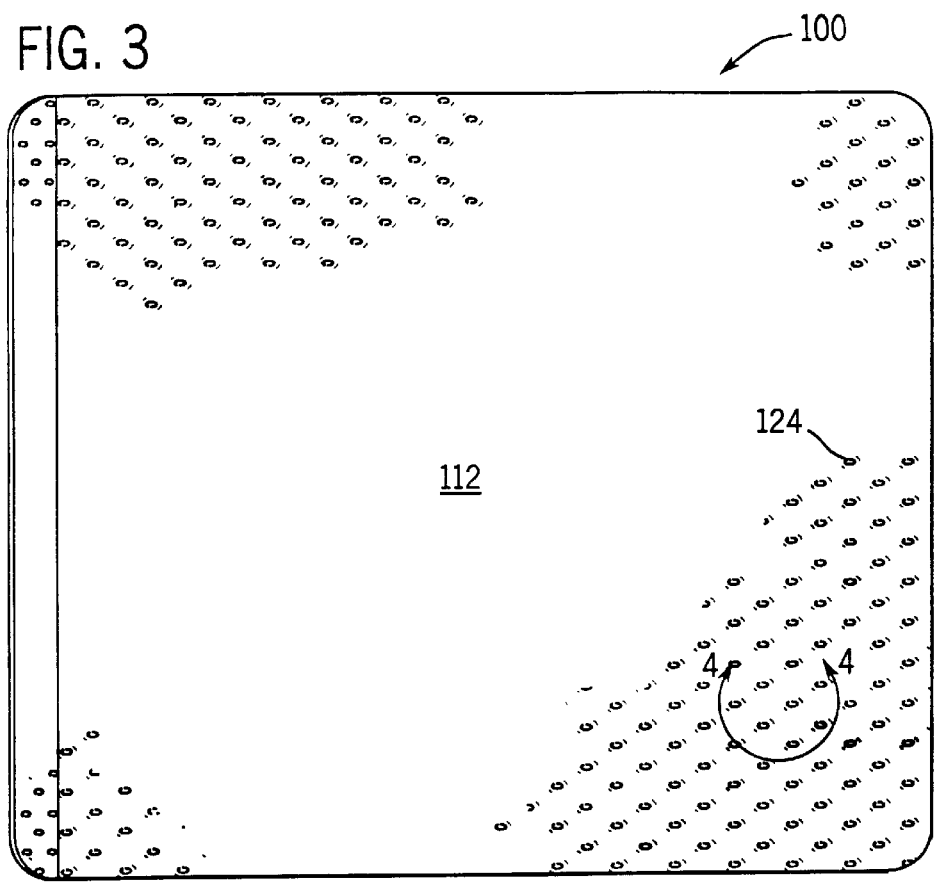
FIG. 3 is a top view of the baking device having a textured pattern on the upper surface according to a preferred embodiment of the present invention.

Referring generally to FIGS. 1–2, a baking device 100 having a textured pattern is generally illustrated. Throughout the following description, baking device 100 is illustrated as a cookie sheet, although other baking devices, such as cake pans, loaf pans, muffin tins, pizza pans, etc., also are contemplated. Baking device 100 includes an upper sheet 110 having an upper surface 112. Sheet 110 is formed of a relatively ductile metal, such as aluminum, copper and alloys including aluminum or copper, and preferably has a thickness of approximately 0.03 inch. As will be described below, in the present invention, upper surface 112 includes a textured pattern (shown generally in FIG. 1; not shown in FIG. 2) which preferably is formed by a conventional embossing roller. The textured pattern may include surface features having a variety of shapes and which may be arranged in a variety of patterns, each of which will be described more fully below.

As illustrated in FIG. 2 (in which the textured pattern is not shown for simplicity), baking device 100 may further include a lower sheet 114, which also is made of a ductile metal and has a thickness of approximately 0.03 inch. Lower sheet 114 is connected to upper sheet 110 along their peripheral edges such that an air pocket 116 is formed therebetween. For example, upper sheet 110 initially may be somewhat larger than lower sheet 114. The peripheral edge of sheet 110 may then be bent over to form a flange 118 that engages a peripheral edge 120 of sheet 114 and edge 120 and flange 118 may be crimped together. To provide strength and to maintain the spacing which forms the air pocket 116 between sheets 110 and 114, a plurality of support members 122 may be interposed between sheets 110 and 114. For example, support members 122 may be a plurality of spaced detentes disposed along lower sheet 114 which extend into engagement with upper sheet 110. The air pocket 116, which is formed by the spacing arrangement, advantageously isolates or insulates upper sheet 110 from direct heat application during the baking process, thus lessening the danger of overbaking or burning the bottom surface of food products placed on upper sheet 110.

Referring now to FIG. 3, baking device 100 having an exemplary textured pattern on upper surface 112 is illustrated in accordance with a first embodiment of the invention. Although the textured pattern shown in FIG. 3 is disposed over the entire area of upper surface 112, it may be desirable to provide a baking device on which the textured pattern covers only a portion of upper surface 112.

Figure 4:
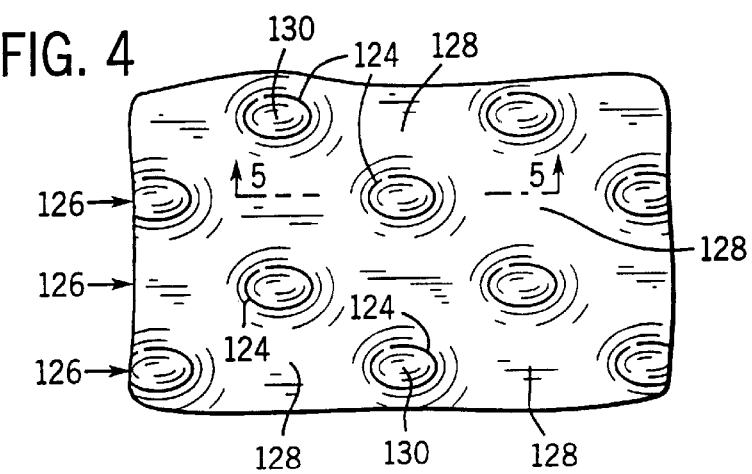
FIG. 4 is a close-up view of the baking device and textured pattern illustrated generally in area 4—4 of FIG. 3.
Figure 5:
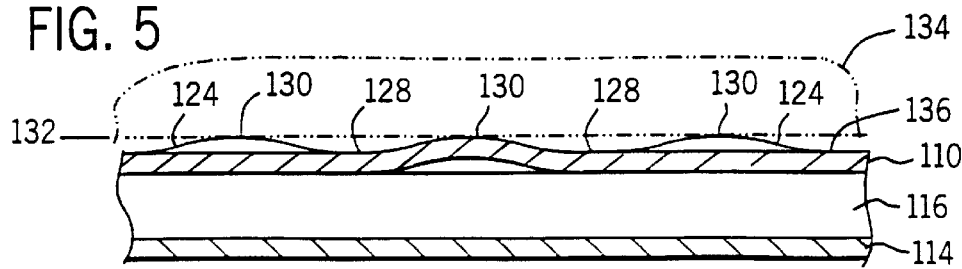
FIG. 5 is a cross-sectional view of the baking device having the textured pattern of FIG. 4, taken generally along the line 5—5.
Figure 6:
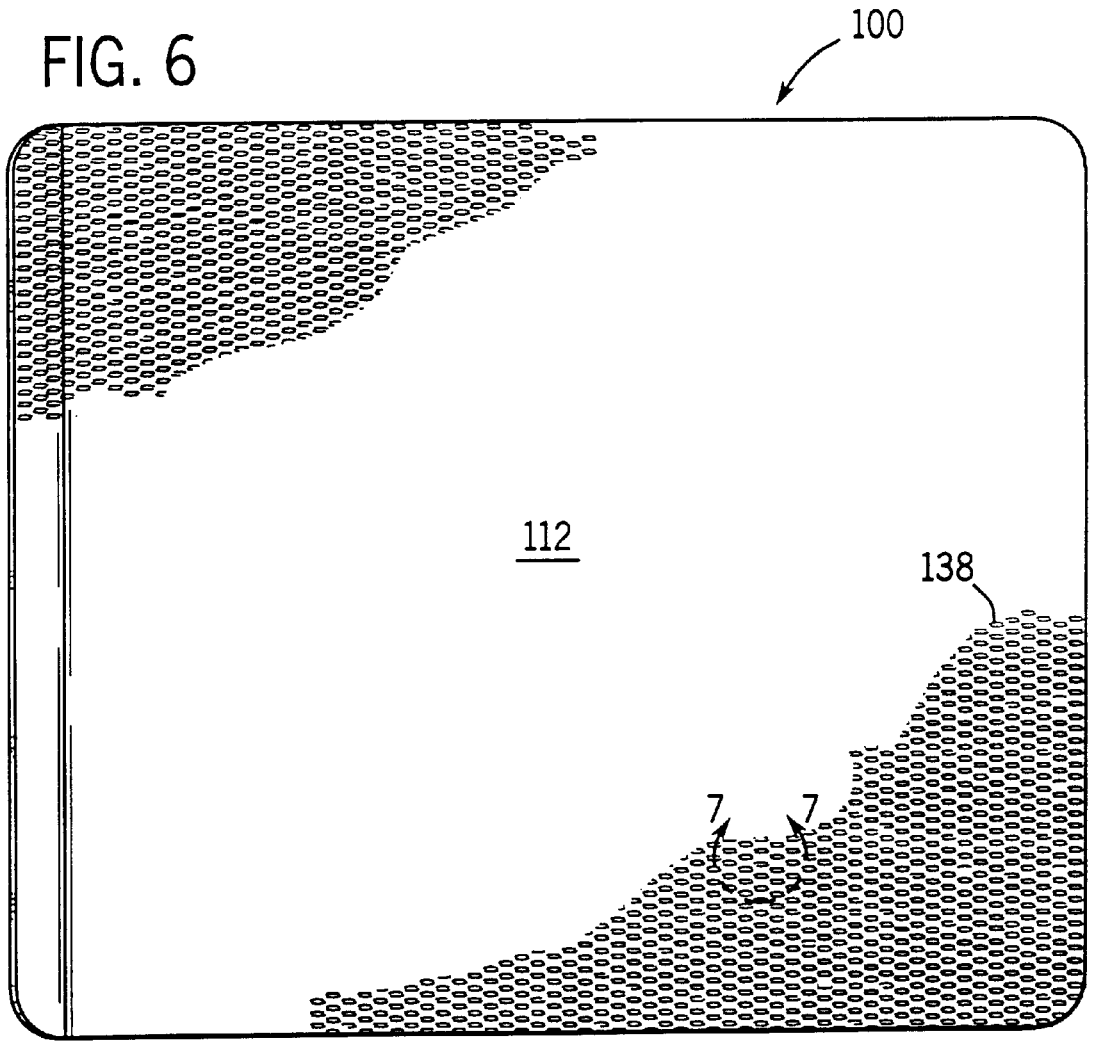
FIG. 6 is a top view of another preferred embodiment of the baking device having a textured surface pattern in accordance with the present invention.

As illustrated in FIGS. 3–5, the textured pattern includes a plurality of protrusions 124 which are arranged in a series of substantially parallel, evenly spaced rows 126, which each include a plurality of evenly spaced protrusions 124. Adjacent rows of protrusions 124 and adjacent protrusions 124 in a row are separated by a relatively flat recessed portion 128. Further the protrusions 124 in a row 126 may be offset from the protrusions 124 in the adjacent row 126 such that the protrusions 124 in every other row 126 are aligned.

The shape and height of protrusions 124 may be uniform throughout the textured pattern. Each protrusion 124 may range in shape from circular to oval, has an upper food contacting surface 130 that lies within a plane 132, and may have rounded side surfaces which gently slope from the food contacting surface 130 to the recessed portion 128. The height of upper food contacting surfaces 130 relative to recessed portions 128 is in the range between 0.002 to 0.050 inch, and more preferably is between 0.004 and 0.025 inch, and most preferably is between 0.005 and 0.015 inch. Additionally, the frequency of protrusions 124 is about nine protrusions per square inch of area of upper surface 112.

Protrusions 124 with upper food contacting surfaces 130 assist in supporting a food product 134 (shown in phantom lines) above recessed portions 128, creating passageways that allow air to circulate under the food product. This air circulation allows for more even distribution of heat about the bottom surface of food product 132. In embodiments of the invention in which baking device 100 does not include lower sheet 114 and air pocket 116, the air circulation further prevents burning or overcooking of the food product's bottom surface which could otherwise result if the entire bottom surface were in direct contact with the heated upper surface 112 of upper sheet 110.

Upper food contacting surfaces 130 of protrusions 124 may be rounded, thus presenting a relatively small surface area that comes into contact with food product 134, such as a cookie, cake, pizza, etc., that is placed on upper surface 112 of sheet 110, although the food contacting surfaces may also be relatively flat. In the preferred embodiment, the total area of the food contacting surfaces 130 is less than or equal to one-third of the area of plane 132 in which the surfaces lie. This small fractional amount of surface area allows food product 132 to be easily released from the upper surface 112 of sheet 110, thus providing a non-stick effect. Further, the small surface area of the food contacting surfaces 132 minimizes the amount of upper surface 112 that is exposed to the abrasive action of cooking and cleaning utensils. Less exposed surface area advantageously decreases the occurrence of scratches or other damage to upper surface 112, which increases the useful life and preserves the appearance of baking device 100.

In the preferred embodiment of the invention, a non-stick coating 136 may be applied to upper surface 112 of upper sheet 110 by conventional methods, which further enhances the ability to release food products from the surface of baking device 100. Non-stick coating 136 preferably is a polymeric coating and is approximately 0.003 to 0.005 inch thick. The non-stick coating is easily uniformly applied to upper surface 112 because, in part, of the smooth, rounded shape of the protrusions 124 and the easily accessible recessed portions 128 interspersed between the protrusions. That is, the textured pattern of the present invention has a minimum number of sharp or vertical edges and small crevasses which often present difficulties when attempting to achieve a uniform coating across a surface area. The smooth, rounded shape of protrusions 124 further inhibits cooking or cleaning utensils from catching on sharp edges and damaging the non-stick coating. However, even if non-stick coating 136 does wear off, the textured pattern ensures that the coating will wear off primarily on the upper food contacting surfaces 130, which, as discussed above, comprises only a relatively small amount of surface area. Accordingly, wearing of the non-stick coating from the upper food contacting surfaces will not unduly compromise the non-stick qualities of baking device 100. In particular, food products will still release easily from the small surface area presented by upper food contacting surfaces 130. Further, the coating on the recessed portions 128 will not be easily damaged since it is not readily exposed to cooking or cleaning utensils. Thus, portions of a food product which do contact the recessed portions can be easily removed.

Referring now to FIGS. 6–9, a second preferred embodiment of baking device 100 having a textured pattern on upper surface 112 of upper sheet 110 is illustrated. The textured pattern in this embodiment is a variation of the pattern illustrated in FIGS. 3–5 (described above). Further, the textured pattern provides the same advantages discussed above with respect to FIGS. 3–5. The details of this variation of the textured pattern will now be described.

The textured pattern shown in FIGS. 6–9 includes a plurality of protrusions 138 arranged in substantially parallel, evenly spaced rows 140 which extend along the length of upper sheet 110. Each row 140 includes a plurality of protrusions 138 which are evenly spaced along the length of the respective row 140. Adjacent rows 140 and adjacent protrusions 138 are separated by a recessed portion 142. Further the protrusions 138 in a row 140 preferably are offset from the protrusions 138 in the adjacent row 140 such that the protrusions 138 in every other row 140 are aligned.

The shape and height of protrusions 138 preferably are uniform throughout the textured pattern. Each protrusion 138 has an elongated oval shape, has a rounded upper food contacting surface 144 that lies within a plane 146, and has gently sloping, rounded side surfaces which extend from the food contacting surface 144 to the recessed portion 142. The area of the upper food contacting surfaces is approximately equal to or less than one-third the area of plane 146, and the height of upper food contacting surfaces 144 relative to recessed portions 142 is in the range between 0.002 and 0.050 inch. More preferably, however, the height of surfaces 144 relative to recessed portions 142 is between 0.004 and 0.025 inch, and most preferably is between 0.005 and 0.015 inch. Additionally, the frequency of protrusions 138 is about eleven to twelve protrusions per square inch of area of upper surface 112.

Figure 10:
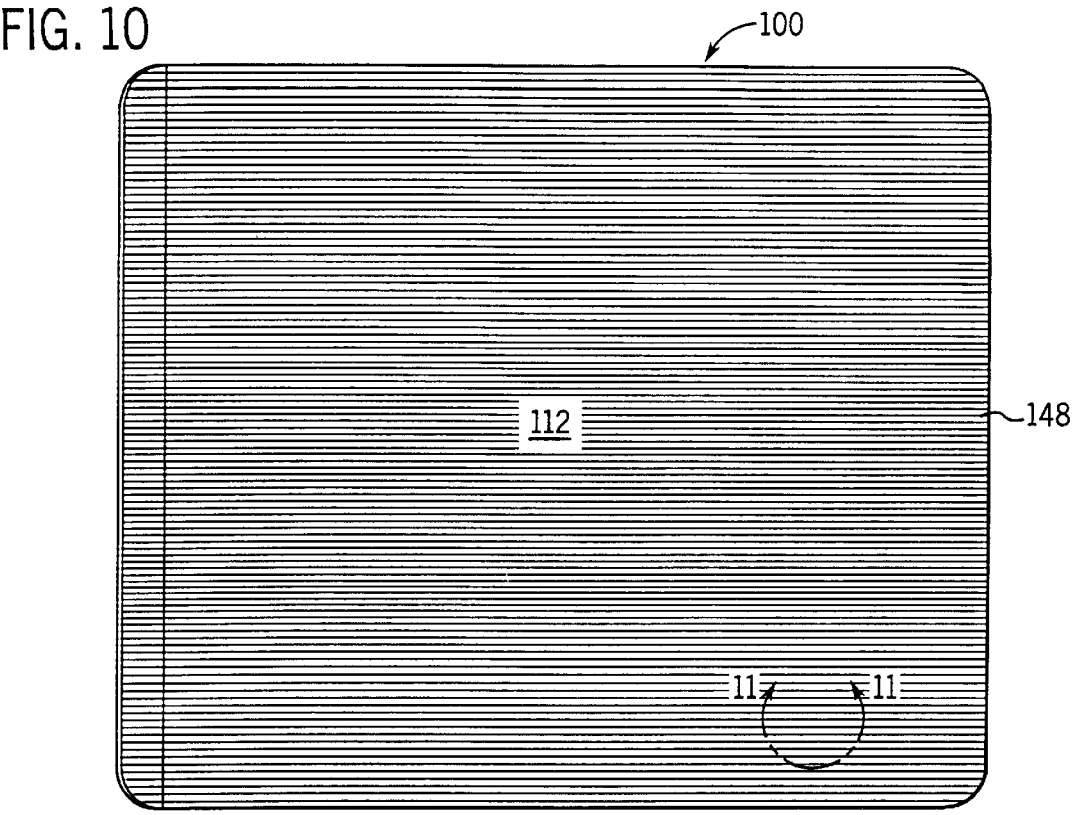
FIG. 10 is a top view of another preferred embodiment of a baking device having a textured surface pattern in accordance with the present invention.
Figure 11:
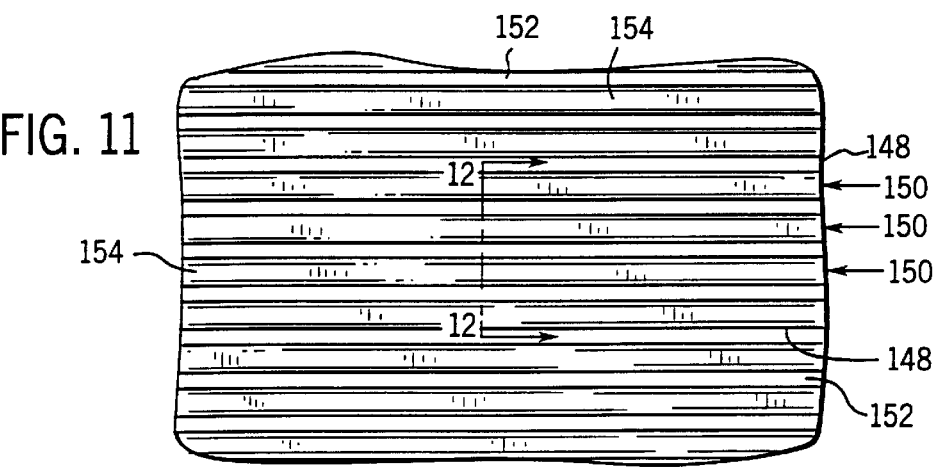
FIG. 11 is a close-up view of the baking device having the textured pattern of FIG. 10, illustrated generally in the area 11—11.
Figure 12:
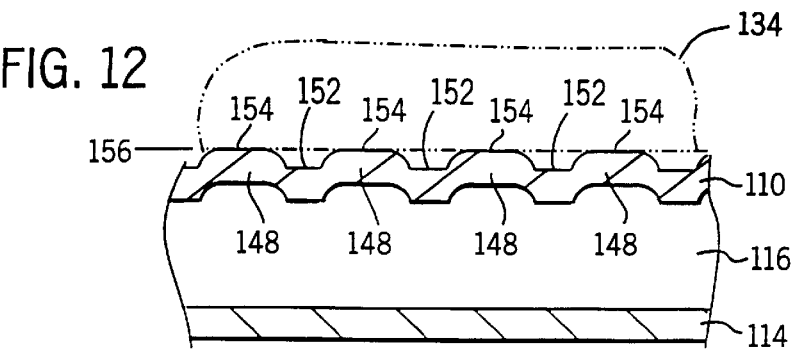
FIG. 12 is a cross-sectional view of the baking device having the textured pattern of FIG. 11, taken generally along the line 12—12.

Turning now to FIGS. 10–12, a third preferred embodiment of baking device 100 having a textured pattern on upper surface 112 of upper sheet 110 is illustrated. This textured pattern is yet another variation of the patterns described above and presents the same advantages discussed above. The details of this pattern will now be described.

The textured pattern shown in FIGS. 10–12 includes a plurality of protrusions 148 arranged in substantially parallel, evenly spaced rows 150 which extend along the length of upper sheet 110. Each row 150 includes a single protrusion 148 which extends continuously along the length of the respective row 150. Adjacent rows 150 are separated by a recessed portion 152, which preferably is relatively flat.

The shape and height of protrusions 148 preferably are uniform throughout the textured pattern. Each protrusion 148 has an elongated rounded shape, including an upper food contacting surface 154 that lies within a plane 156 and gently sloping, rounded side surfaces which extend from the food contacting surface 154 to the recessed portion 152. In the preferred embodiment illustrated, upper food contacting surfaces 154 are relatively flat. However, a rounded upper food contacting surface also is contemplated. The area of the upper food contacting surfaces is approximately equal to or less than one-half the area of plane 156. The height of upper food contacting surfaces 154 relative to recessed portions 152 is in the range between 0.002 and 0.050 inch, and more preferably is between 0.004 and 0.025 inch, and most preferably is between 0.005 and 0.015 inch. Additionally, the textured pattern includes approximately seven rows per inch extending across the width of upper surface 112.

Although the foregoing description has been provided for the presently preferred embodiments of the invention, the invention is not intended to be limited to any particular arrangement, but is defined by the appended claims. For example, certain variations of the textured pattern may include protrusions that are not uniformly shaped or evenly spaced, thus perhaps creating a decorative pattern within the textured pattern, or that do not have a uniform height. Alternatively, the protrusions in adjacent rows may be aligned rather than offset as described above, or every two or three rows may be aligned rather than every other row. Further, it is contemplated that the protrusions may be spaced more closely or further apart than as described above. Or, the recessed portions may be concave or may further include a narrow groove or channel formed therein. As still a further alternative, the protrusions may be arranged in a circular, or other, pattern rather than in straight rows. Moreover, baking device 100 need not include a lower sheet and an airpocket. Thus, baking device 100 may include only an upper sheet, having an appropriate thickness, on which the textured pattern is formed, such as by using an embossing roller and a smooth roller. These and other alternative configurations of the invention, that may occur to those skilled in the art, are intended to form a part of the present invention to the extent such alternatives fall within the scope of the appended claims.

What is claimed is:

1. A baking device for baking a food product, comprising:
    a first metal layer including an upper surface to support the food product when placed thereon, the upper surface having a textured pattern comprising a plurality of evenly spaced, substantially straight rows of protrusions, each protrusion having an upper food contacting surface and a side surface; and
    a second metal layer connected to the first metal layer such that an air pocket is formed therebetween,
    wherein adjacent rows of the protrusions are separated by a substantially flat recessed portion extending continuously between the side surfaces of adjacent protrusions, and the upper food contacting surface of each protrusion has a height relative to the substantially flat recessed portion in a range between 0.002 and 0.050 inch.

2. The baking device as recited in claim 1, wherein each protrusion extends continuously along a length of each row.

3. The baking device as recited in claim 2, wherein the textured pattern comprises approximately seven rows per inch extending across a width of at least a portion of the upper surface.

4. The baking device as recited in claim 1, wherein each row includes a plurality of the protrusions, the protrusions being evenly spaced along a length of the respective row.

5. The baking device as recited in claim 4, wherein the textured pattern comprises approximately nine to eleven protrusions per square inch of at least a portion of the upper surface.

6. The baking device as recited in claim 4, wherein the protrusions have an oval shape.

7. The baking device as recited in claim 1, wherein the upper food contacting surfaces of the protrusions are rounded.

8. The baking device as recited in claim 1, further comprising a non-stick coating disposed on the upper surface.

9. The baking device as recited in claim 1, wherein the upper food contacting surfaces have a contact area lying in a plane.

10. The baking device as recited in claim 9, wherein the contact area is less than or equal to one-third of an area of the plane.

11. The baking device as recited in claim 1, wherein the height relative to the substantially flat recessed portion is in a range between 0.004 to 0.025 inch.

12. The baking device as recited in claim 1, wherein the height relative to the substantially flat recessed portion is in a range between 0.005 to 0.015 inch.

13. A baking device, comprising:

a first metal layer; and a second metal layer connected to the first metal layer such that an air pocket is formed therebetween, the second metal layer having an upper surface having a patterned surface area, the patterned surface area including a textured pattern having a plurality of evenly spaced, substantially straight rows of protrusions separated by substantially flat recessed portions lying in a first plane and extending continuously between adjacent rows, each protrusion having an upper food contacting surface lying within a second plane parallel to and disposed above the first plane, the second plane having an area, wherein the upper food contacting surfaces have a contact area that is less than or equal to one-third the area of the second plane.

14. The baking device as recited in claim 13, wherein the distance between the first and second planes is in a range between 0.002 to 0.050 inch.

15. The baking device as recited in claim 13, wherein each protrusion extends continuously along a length of each row.

16. A baking device for baking a food product, comprising:

a first metal layer having an upper surface; and a second metal layer connected to the first metal layer such that an air pocket is formed therebetween;

wherein the upper surface of the first metal layer includes a textured pattern comprising a substantially flat portion disposed in a first plane and a plurality of rounded protrusions, each protrusion having an upper food contacting surface that lies in a second plane disposed above and substantially parallel to the first plane and a side surface extending between the first and second planes, the substantially flat portion extending continuously between the side surfaces of adjacent protrusions.

17. The baking device as recited in claim 16, wherein the plurality of protrusions are arranged in a plurality of substantially straight, evenly spaced rows.

18. The baking device as recited in claim 17, wherein each protrusion extends continuously along a length of each row.

19. The baking device as recited in claim 16, wherein the distance between the first and second planes is in a range between 0.002 and 0.050 inch.

20. The baking device as recited in claim 16, wherein the distance between the first and second planes is in a range between 0.004 and 0.025 inch.

* * * * *